US011859424B2

(12) United States Patent
Kunz

(10) Patent No.: US 11,859,424 B2
(45) Date of Patent: Jan. 2, 2024

(54) WINDOW COUNTERBALANCE BRAKE SHOE AND SPRING ASSEMBLY WITH IMPROVED BRAKE STRENGTH

(71) Applicant: John Evans' Sons, Inc., Landsdale, PA (US)

(72) Inventor: John R. Kunz, Douglassville, PA (US)

(73) Assignee: John Evans' Sons, Incorporated, Lansdale, PA (US)

( * ) Notice: Subject to any disclaimer, the term of this patent is extended or adjusted under 35 U.S.C. 154(b) by 54 days.

(21) Appl. No.: 17/553,770

(22) Filed: Dec. 16, 2021

(65) Prior Publication Data

US 2023/0193674 A1 Jun. 22, 2023

(51) Int. Cl.
*E05D 13/00* (2006.01)

(52) U.S. Cl.
CPC .... *E05D 13/1276* (2013.01); *E05Y 2900/148* (2013.01)

(58) Field of Classification Search
CPC ............ E05D 13/1276; E05D 13/1284; E05D 13/1292; E05D 13/08; E05D 15/22
USPC ............................................................ 16/197
See application file for complete search history.

(56) References Cited

U.S. PATENT DOCUMENTS 5,210,976 A * 5/1993 Cripps ................ E05D 13/1276 49/181
5,232,208 A * 8/1993 Braid .................. E05D 13/1276 267/156
5,301,467 A * 4/1994 Schmidt .............. E05D 13/1207 49/176
6,378,169 B1 * 4/2002 Batten ................. E05D 13/1276 16/197
8,640,383 B1 * 2/2014 Kunz ....................... E05D 15/22 49/446
8,819,896 B2 * 9/2014 Kellum, III ......... E05D 13/1276 16/401
9,334,683 B1 * 5/2016 Kunz .................. E05D 13/1276
9,371,677 B1 * 6/2016 Kunz ....................... E05D 15/22
9,995,071 B2 * 6/2018 Kunz ....................... E05D 15/22
10,081,972 B1 * 9/2018 Kunz ......................... E05D 5/02
10,941,599 B2 * 3/2021 Kunz .................. E05D 13/1276

* cited by examiner

*Primary Examiner* — Jeffrey O'Brien
(74) *Attorney, Agent, or Firm* — LaMorte & Associates, P.C.

(57) ABSTRACT

A counterbalance system that is set into the guide track of a tilt-in window. The counterbalance system utilizes a brake shoe that is attached to a ribbon spring. The ribbon spring has a shaped head that is retained by the brake shoe. A flexible tab is formed in the ribbon spring near the shaped head. A protrusion extends from the brake shoe. The brake shoe has a receptacle that receives and retains the shaped head of the ribbon spring, therein interconnecting the ribbon spring to the brake shoe. A cam is supported within the brake shoe. The brake shoe expands when the cam is turned. This causes the protrusion on the brake shoe to be biased against the flexible tab in the ribbon spring. This, in turn, causes the flexible tab to flex and extend away from the ribbon spring at an inclined angle. Within the guide track of the tilt-in window, the extended flexible tab acts as a barb and engages the side wall of the guide track. This helps prevent the window sash from being moved when the window sash is tilted open.

14 Claims, 7 Drawing Sheets

WINDOW COUNTERBALANCE BRAKE SHOE AND SPRING ASSEMBLY WITH IMPROVED BRAKE STRENGTH

BACKGROUND OF THE INVENTION

1. Field of the Invention

In general, the present invention relates to counterbalance systems for windows that prevent open window sashes from moving under the force of their own weight. More particularly, the present invention system relates to the structure of both the brake shoe and spring components of the counterbalance system.

2. Description of the Prior Art

There are many types and styles of windows. One of the most common types of windows is the double-hung window. Double-hung windows are the window of choice for most home construction applications. A double-hung window consists of an upper window sash and a lower window sash. Either the upper window sash or the lower window sash can be selectively opened and closed by a person sliding the sash up and down within the window frame.

A popular variation of the double-hung window is the tilt-in double-hung window. Tilt-in double-hung windows have sashes that can be selectively moved up and down. Additionally, the sashes can be selectively tilted into the home so that the exterior of the sashes can be cleaned from within the home.

The sash of a double-hung window has a weight that depends upon the materials used to make the window sash and the size of the window sash. Since the sashes of a double-hung window are free to move up and down within the frame of a window, some counterbalancing system must be used to prevent the window sashes from constantly moving to the bottom of the window frame under the force of gravity.

For many years, counterbalance weights were hung next to the window frames in weight wells. The weights were attached to window sashes using a string or chain that passed over a pulley at the top of the window frame. The weights counterbalanced the weight of the window sashes. As such, when the sashes were moved in the window frame, they had a neutral weight and friction would hold them in place.

The use of weight wells, however, prevents insulation from being packed tightly around a window frame. Furthermore, the use of counterbalance weights on chains or strings cannot be adapted well to tilt-in double-hung windows. Accordingly, as tilt-in windows were being developed, alternative counterbalance systems were developed that were contained within the confines of the window frame yet did not interfere with the tilt action of the tilt-in windows.

Modern tilt-in double-hung windows are primarily manufactured in one of two ways. There are vinyl frame windows and wooden frame windows. In the window manufacturing industry, different types of counterbalance systems are traditionally used for vinyl frame windows and for wooden frame windows. The present invention is mainly concerned with the structure of vinyl frame windows. As such, the prior art concerning vinyl frame windows is herein addressed.

Vinyl frame, tilt-in, double-hung windows are typically manufactured with guide tracks along the inside of the window frame. Brake shoe assemblies are placed in the guide tracks and ride up and down within the guide tracks. Each sash of the window has two tilt posts that extend into the brake shoes and cause the shoes to ride up and down in the guide tracks as the window sashes are opened or closed. The brake shoes contain a mechanical stop that is activated by the tilt post of the window sash when the window sash is tilted inwardly away from the window frame. The brake shoes therefore lock the tilt posts in place and prevent the base of the sash from moving up or down in the window frame once the sash is tilted open. Furthermore, the brake shoes are attached to ribbon springs inside the guide tracks of the window assembly. Ribbon springs are constant force springs and supply the counterbalance force needed to suspend the weight of the window sash.

In a window counterbalance system, the pull of the ribbon springs counters the weight of a window sash. However, when the window sash is tilted inward for cleaning, or when the window sash is removed altogether, part of the weight of the sash is supported by the hands of the person tilting the window forward. As a result, the counterbalance pull of the ribbon springs becomes much greater than the weight of the tilted sash being countered. To prevent the pull of the ribbon springs from moving the window sash when it is tilted, the brake shoes must contain a strong brake mechanism that locks the shoes in place as the window sash tilts.

In U.S. Pat. No. 9,371,677 to Kunz, a brake shoe is disclosed that uses a cam to expand and lock in place. The cam is turned when the window sash is tilted. The expanding brake shoe locks into a track in the window frame. In addition to the expansion created by the cam, the brake shoe also contains a sharpened post that extends from the side of the brake shoe. The post is biased into the material of the window frame when the window sash is tilted. Although effective, the use of the post can create some long-term issues. The post is static. As such, the post does not retract and may touch parts of the window track as the sash is moved up and down. This can groove the window track and generate debris within the window track. Over time, this may affect the performance of the window.

A need therefore exists in the field of vinyl, tilt-in windows, for a counterbalance system having a brake shoe with a dynamic locking system that only engages the track of a window when the window sash is tilted. This need is met by the present invention as described and claimed below.

SUMMARY OF THE INVENTION

The present invention is a counterbalance system that is set into the guide track of a tilt-in window. The counterbalance system utilizes a brake shoe that is attached to a ribbon spring. The ribbon spring has a shaped head that is retained by the brake shoe. A flexible tab is formed in the ribbon spring near the shaped head. A protrusion extends from the brake shoe. The brake shoe has a receptacle that receives and retains the shaped head of the ribbon spring, therein interconnecting the ribbon spring to the brake shoe.

A cam is supported within the brake shoe. The brake shoe expands when the cam is turned. This causes the protrusion on the brake shoe to be biased against the flexible tab in the ribbon spring. This, in turn, causes the flexible tab to flex and extend away from the ribbon spring at an inclined angle.

Within the guide track of the tilt-in window, the extended flexible tab acts as a barb and engages the side wall of the guide track. This helps prevent the window sash from being moved by the ribbon spring when the window sash is tilted open. When the window sash is tilted closed, the flexible tab retracts and the window sash is uninhibited in the guide track.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

The claimed features of the present invention brake shoe and ribbon spring can be incorporated into many window counterbalance designs. However, the embodiments illustrated show only two exemplary embodiments of the counterbalance system for the purpose of disclosure. The embodiments illustrated are selected in order to set forth two of the best modes contemplated for the invention. The illustrated embodiments, however, are merely exemplary and should not be considered limitations when interpreting the scope of the appended claims.

Figure 1:
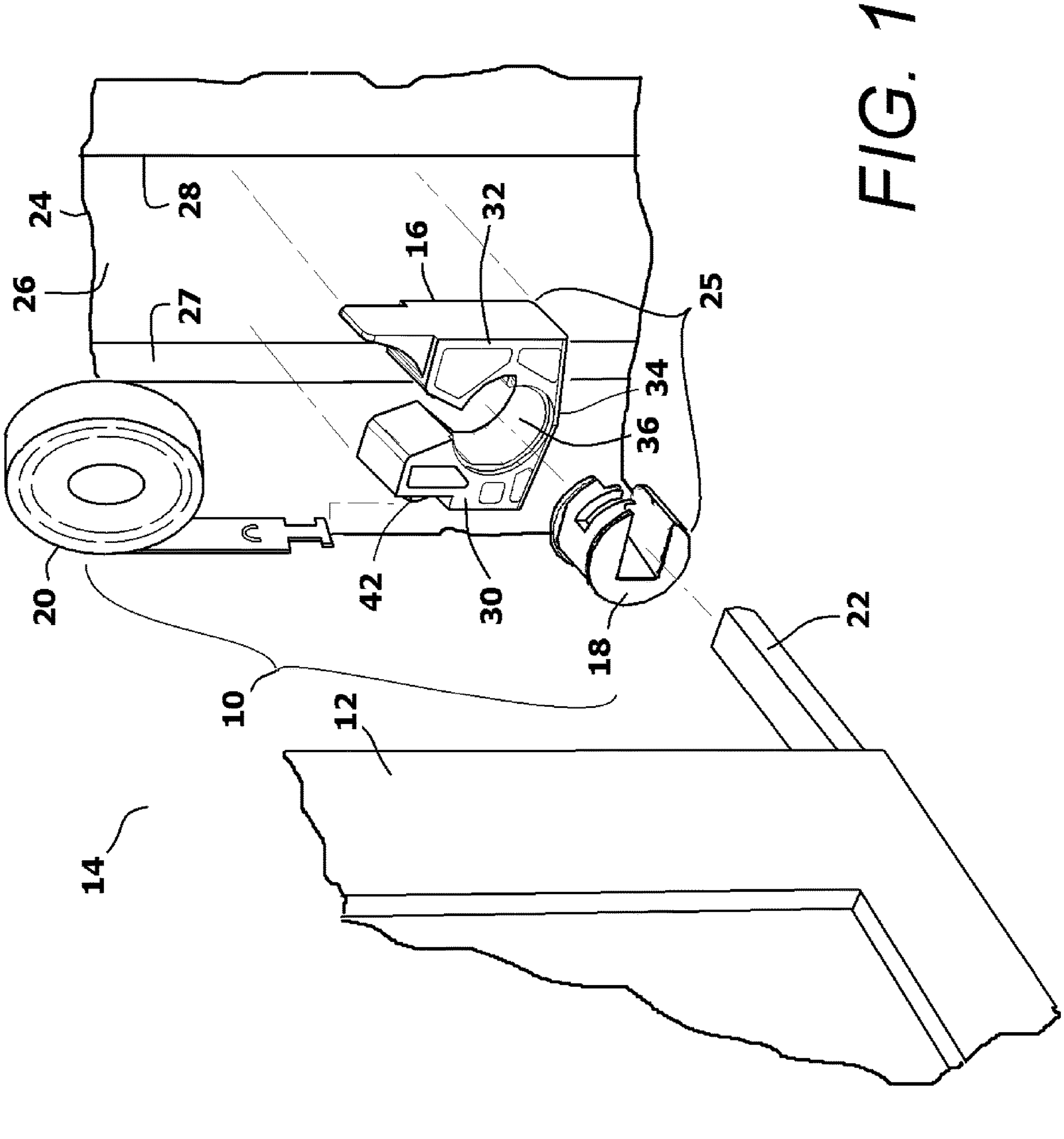
FIG. 1 is an exploded perspective view of a section of a tilt-in window assembly containing a counterbalance system in accordance with the present invention.
Figure 2:
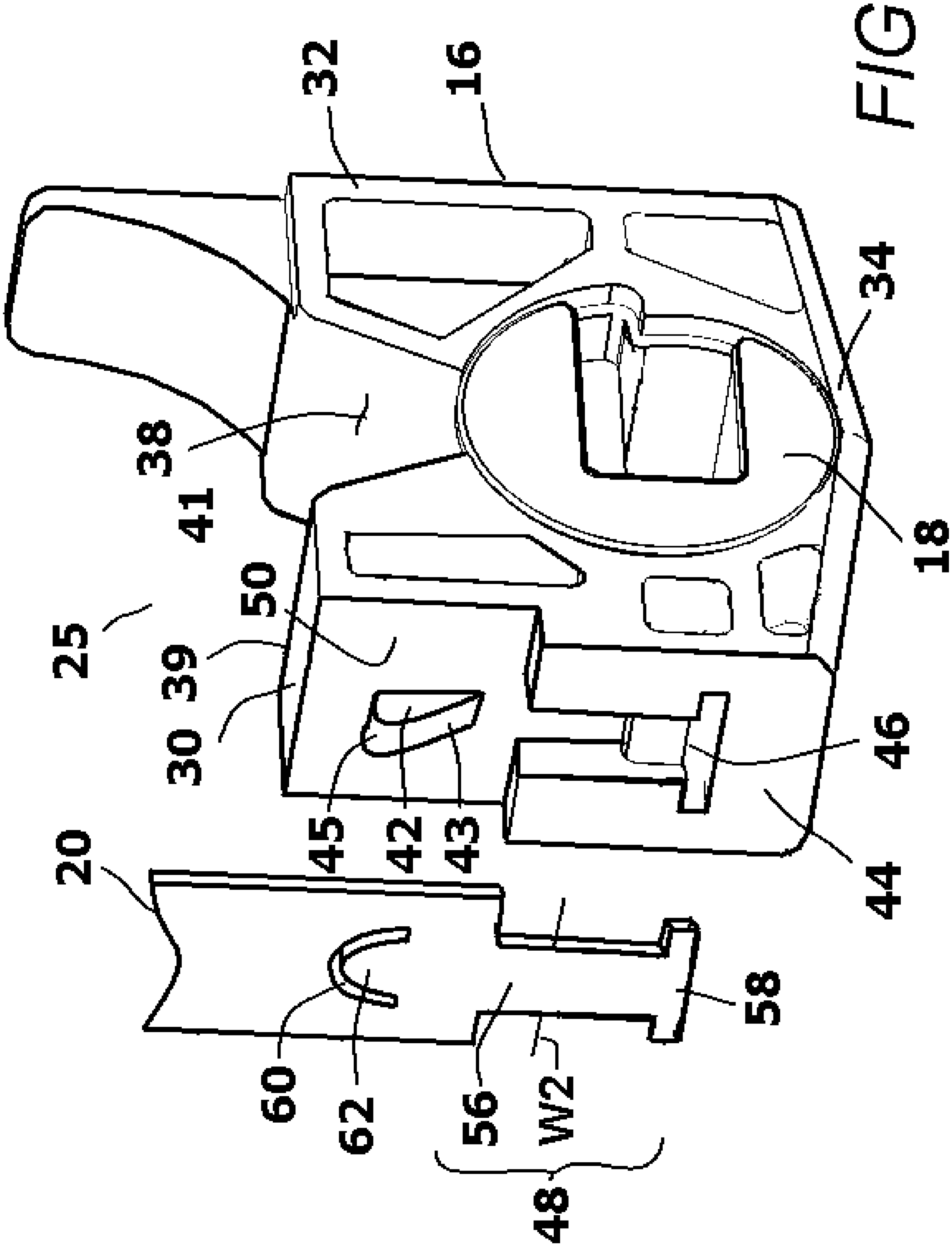
FIG. 2 is a perspective view of the brake shoe assembly and the free end of the ribbon spring shown disconnected to better show interconnection features.

Referring to FIG. 1, in conjunction with FIG. 2, there is shown an exemplary embodiment of a counterbalance system 10 that is used to counterbalance the sashes 12 contained within a window assembly 14. The counterbalance system 10 utilizes a brake shoe housing 16, a cam element 18, and at least one ribbon spring 20 on either side of each window sash 12. The brake shoe housing 16 engages a tilt post 22 that extends from the bottom of the window sash 12. As the window sash 12 is opened and closed, the brake shoe housing 16 travels up and down in vertical guide tracks 24. It will be understood that each window sash 12 typically utilizes two counterbalance systems on opposite sides of the sash 12. However, for the sake of simplicity and clarity, only one counterbalance system 10 is illustrated.

The brake shoe housing 16 receives the cam element 18 to form a brake shoe assembly 25. The brake shoe assembly 25 rides up and down in its guide track 24. The brake shoe assembly 25 is pulled upwardly within the guide track 24 by at least one ribbon spring 20. The guide track 24 has a rear wall 26 and two side walls 27, 28. The brake shoe assembly 25 is sized to be just narrow enough to fit between the side walls 27, 28 of the guide track 24 without causing excessive contact with the guide track 24 as the brake shoe assembly 25 moves up and down with the window sash 12.

The brake shoe housing 16 is plastic and is unistructurally molded as a single unit that requires no assembly. The brake shoe housing 16 is generally U-shaped, having a first arm element 30 and a second arm element 32 that are interconnected by a thin bottom section 34. In the shown embodiment, the ribbon spring 20 selectively attaches to the first arm element 30 in a manner that is later described.

A generally circular cam opening 36 is formed between the first arm element 30, the second arm element 32 and the bottom section 34. Above the cam opening 36, the first arm element 30 and the second arm element 32 are separated by a gap space 38. The first arm element 30 has a first sloped surface 39 that faces the gap space 38. Likewise, the second arm element 32 has a second sloped surface 41 that faces the gap space 38. Taken together, the first sloped surface 39 and the second sloped surface 41 diverge away from each other as they ascend above the cam opening 36. The result is that the gap space 38 has tapered sides that lead into the cam opening 36.

During manufacture, the cam element 18 is inserted into the cam opening 36 by forcing the cam element 18 into the gap space 38 between the first arm element 30 and the second arm element 32 of the brake shoe housing 16. When pressed into the gap space 38, the cam element 18 spreads the first arm element 30 and the second arm element 32 apart. This is achieved by the elastic flexing of the thin bottom section 34 of the brake shoe housing 16, which acts as a living hinge.

The first arm element 30 has a side surface 44. A receptacle 46 is formed in the side surface 44. The receptacle 46 is sized to receive and retain the shaped head 48 of the ribbon spring 20. A relief 50 is formed in the side surface 44 of the first arm element 30 just above the receptacle 46. An inclined protrusion 42 is disposed in the relief 50. The inclined protrusion 42 has an inclined surface 43 that extends from the surface of the relief 50 to a curved crown 45. The shape of the inclined protrusion 42 enables the inclined protrusion 42 to selectively deform the ribbon spring 20 in a unique manner that is later explained.

Figure 3:
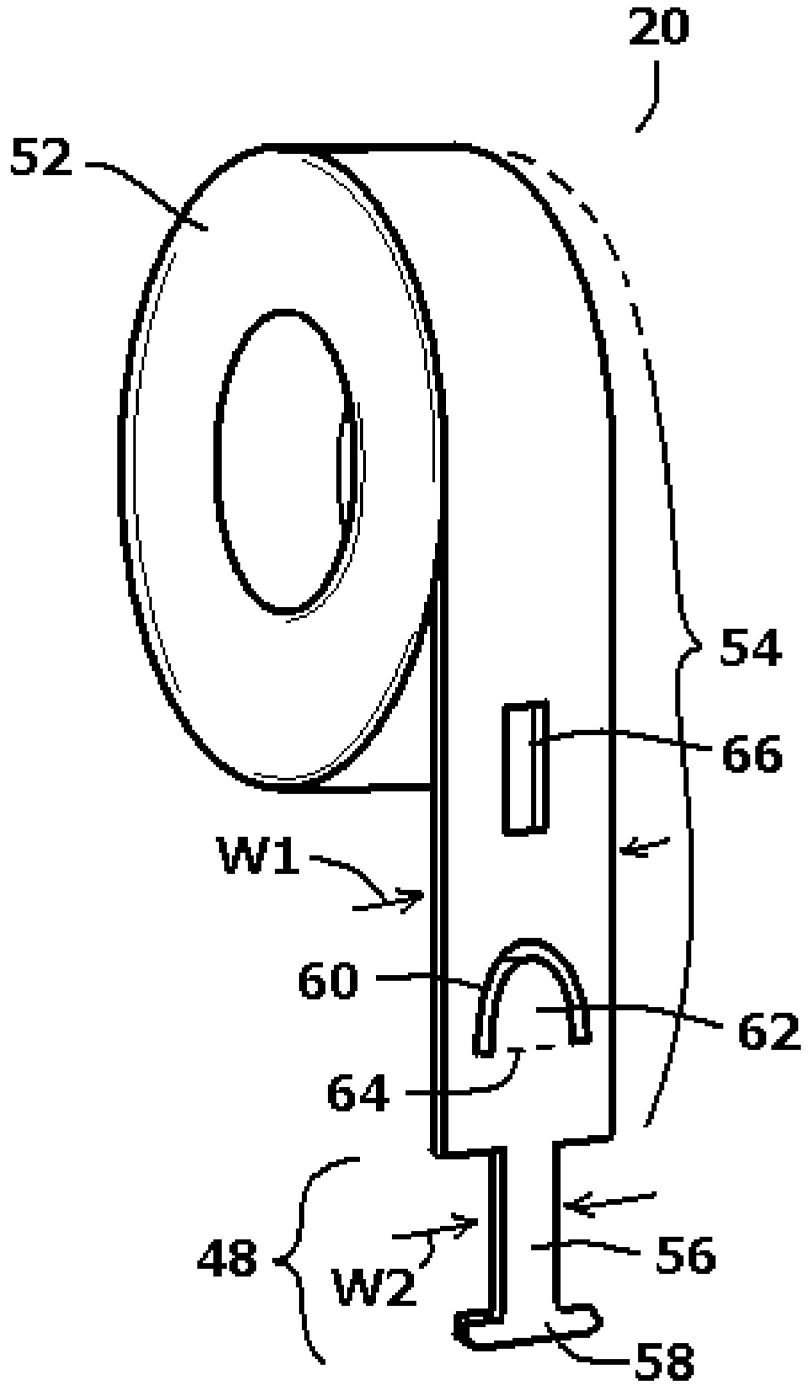
FIG. 3 is a perspective view of the exemplary embodiment of the ribbon spring.

Referring to FIG. 3 in conjunction with FIG. 2, it can be seen that the ribbon spring 20 is made of a wound ribbon 52 of steel. The ribbon spring 20 has a long section 54 with a constant running width W1. The long section 54 terminates at one end with the shaped head 48. The shaped head 48 is T-shaped. That is, at the shaped head 48, the running width W1 of the long section 54 reduces down to a narrow neck 56. The narrow neck 56 has a width W2 that is smaller than the running width W1. The narrow neck 56 extends to a wider leader 58. The leader 58 is wider than the narrow neck 56 but no wider than the running width W1.

A U-shaped hole 60 is formed in the long section 54 of the ribbon spring 20 just prior to the shaped head 48. The U-shaped hole 60 produces a flexible locking tab 62 within the U-shaped hole 60. The flexible locking tab 62 is free on three sides and connected to the remainder of the ribbon spring 20 along a base edge 64. The base edge 64 faces the shaped head 48. Accordingly, the flexible locking tab 62 extends away from the shaped head 48.

An optional connector slot 66 can be formed in the long section 54 proximate the shaped head 48 of the ribbon spring 20. The connector slot 66 is used to interconnect ribbon springs, should a window application require the use of multiple ribbon springs.

Figure 4:
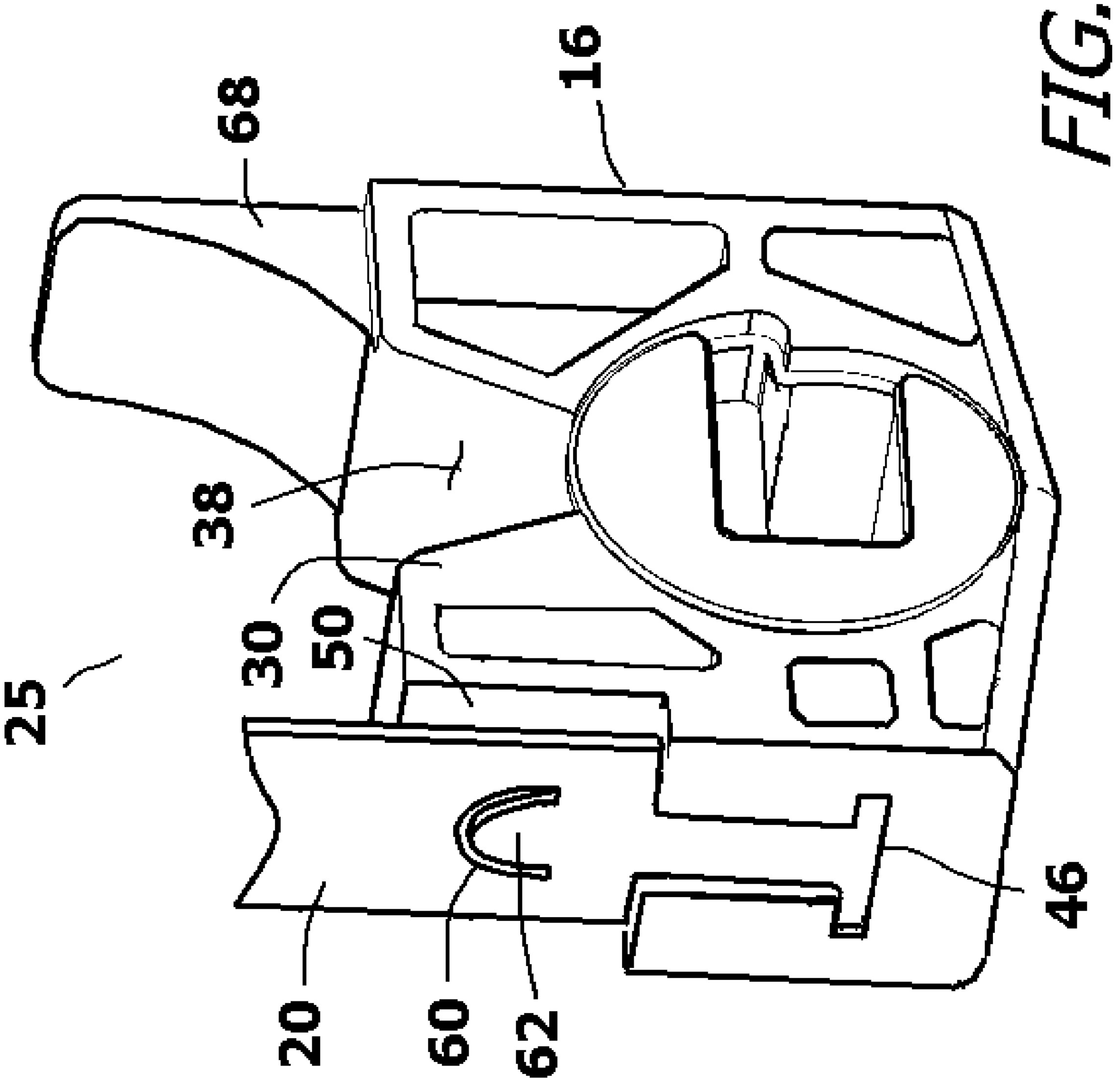
FIG. 4 is a perspective view of the brake shoe assembly and the free end of the ribbon spring shown interconnected.

Referring to FIG. 4 in conjunction with FIG. 2, it can be seen that the shaped head 48 of the ribbon spring 20 interconnects with the first arm element 30 of the brake shoe housing 16. The first arm element 30 of the brake shoe housing 16 is specially designed to receive both the shaped head 48 of the ribbon spring 20 and a length of the ribbon 52 just before the shaped head 48. When the ribbon spring 20 is engaged with the brake shoe housing 16, the shaped head 48 of the ribbon spring 20 enters the receptacle 46 and extends through the relief 50. This aligns the U-shaped hole 60 and flexible locking tab 62 on the ribbon spring 20 with the inclined protrusion 42 on the brake shoe housing 16. The width of the inclined protrusion 42 is generally the same as the width of the flexible locking tab 62. Accordingly, as the ribbon spring 20 is pressed into the relief 50 toward the brake shoe housing 16, the inclined protrusion 42 will deform the flexible locking tab 62 away from the brake shoe housing 16.

Figure 5:
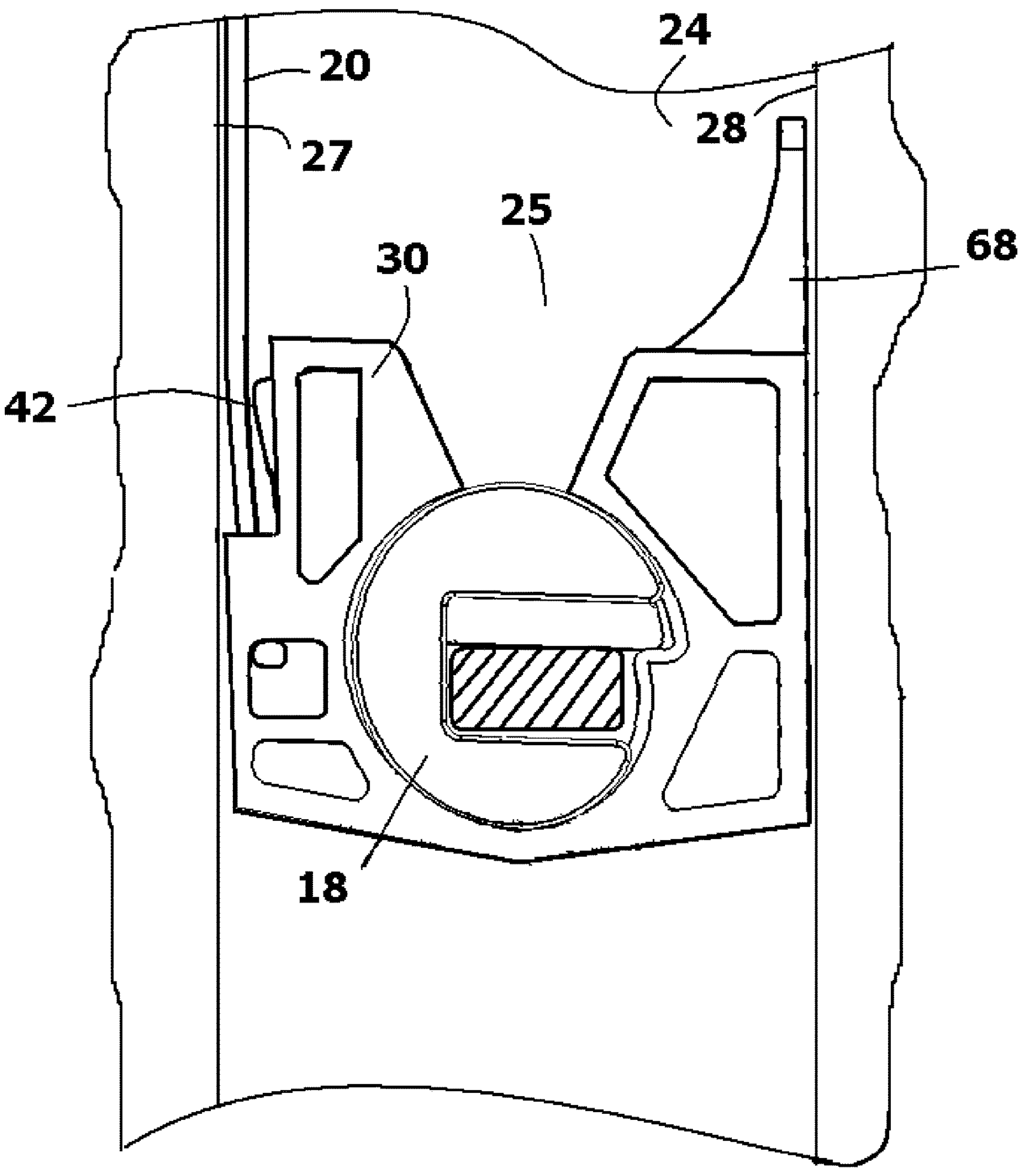
FIG. 5 shows the exemplary embodiment of the counterbalance system in an unlocked condition within a window guide track.

Referring to FIG. 5 in conjunction with FIG. 1, FIG. 2 and FIG. 4, it will be understood that when the sash 12 is closed, the brake shoe assembly 25 is in an unlocked configuration. In the unlocked configuration, the brake shoe assembly 25 is free to slide up and down in the vertical guide track 24. The ribbon spring 20 is attached to the first arm element 30 of the brake shoe housing 16. In the unlocked configuration, the ribbon spring 20 pulls upwardly on the brake shoe housing 16. This causes the brake shoe housing 16 to have a rotational bias in the clockwise direction as it travels up and down in the guide track 24. To prevent the brake shoe housing 16 from cocking in the clockwise direction, the second arm element 32 is provided with an extension 68. The extension 68 elongates the second arm element 32 and provides more surface contact with the side wall 28 of the vertical guide track 24. This extended contact inhibits the brake shoe assembly 25 from binding in the guide track 24.

In the unlocked configuration, the ribbon spring 20 is oriented so that it is not pressed against the inclined protrusion 42. As a result, the inclined protrusion 42 does not deform the flexible locking tab 62 in the center of the U-shaped hole 60.

Figure 6:
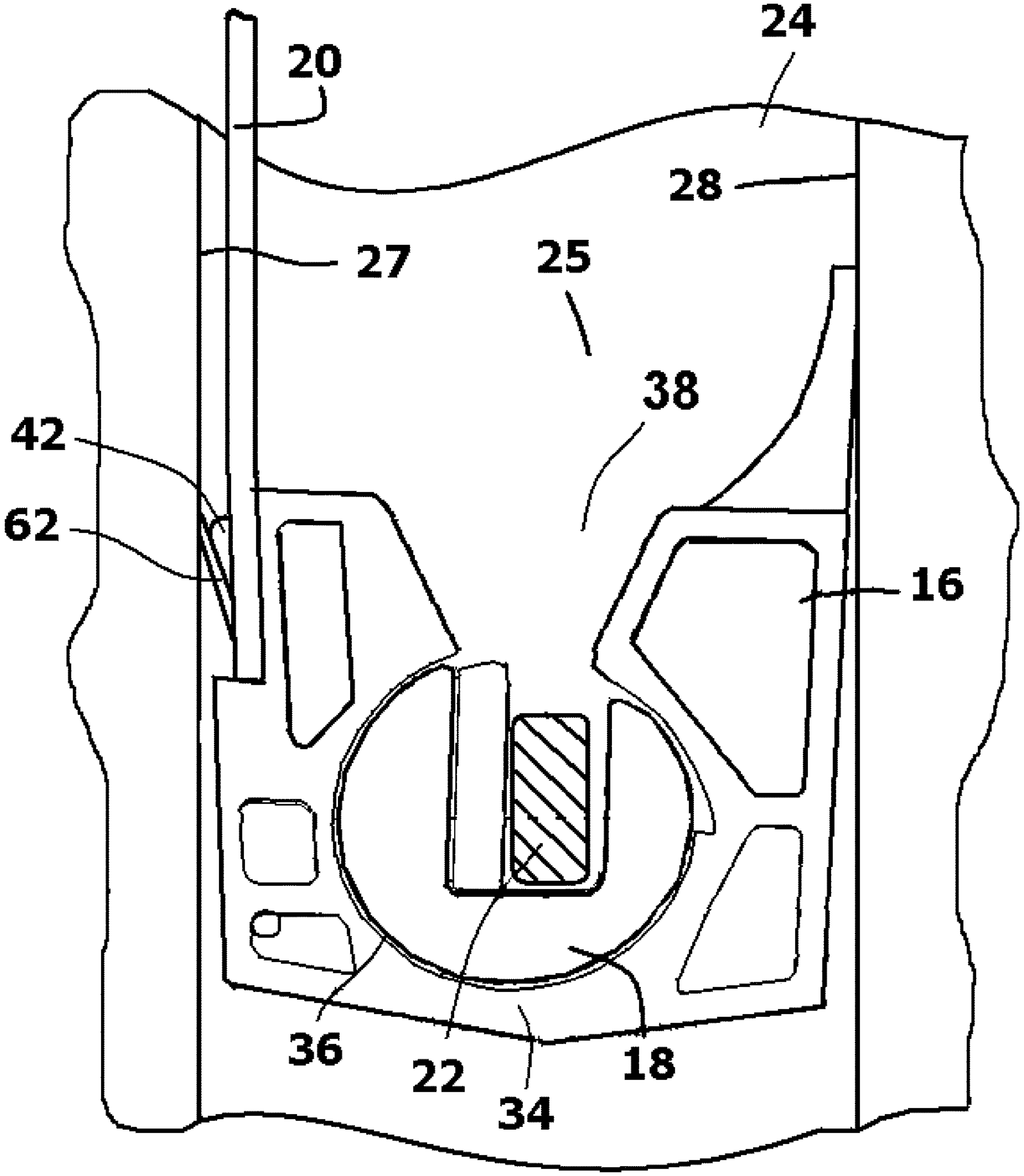
FIG. 6 shows the exemplary embodiment of the counterbalance system in a locked condition within a window guide track.

FIG. 6 shows the brake shoe assembly 25 in a locked configuration. Referring to FIG. 6 in conjunction with FIG. 1 and FIG. 2, it can be seen that when the window sash 12 is tilted inwardly, the tilt post 22 of the window sash 12 causes the cam element 18 to turn inside the cam opening 36. The cam element 18 spreads the first arm element 30 apart from the second arm element 32 of the brake shoe housing 16. As the cam element 18 spreads the brake shoe housing 16, the brake shoe housing 16 flexes in its bottom section 34. The first arm element 30 and the second arm element 32 are displaced and are biased against the side walls 27, 28 of the track 24.

In this locked configuration, the ribbon spring 20 becomes biased against the inclined protrusion 42. The inclined protrusion 42 deflects the flexible locking tab 62. This causes the flexible locking tab 62 to stick out and engage the side wall 27 of the guide track 24. Due to the orientation of the flexible locking tab 62, the flexible locking tab 62 acts like a barb and dramatically increases the forces needed to slide the brake shoe assembly 25 upwardly within the guide track 24. The result is that the brake shoe assembly 25 becomes locked in position within the guide track 24 for as long as the window sash 12 remains tilted.

Figure 7:
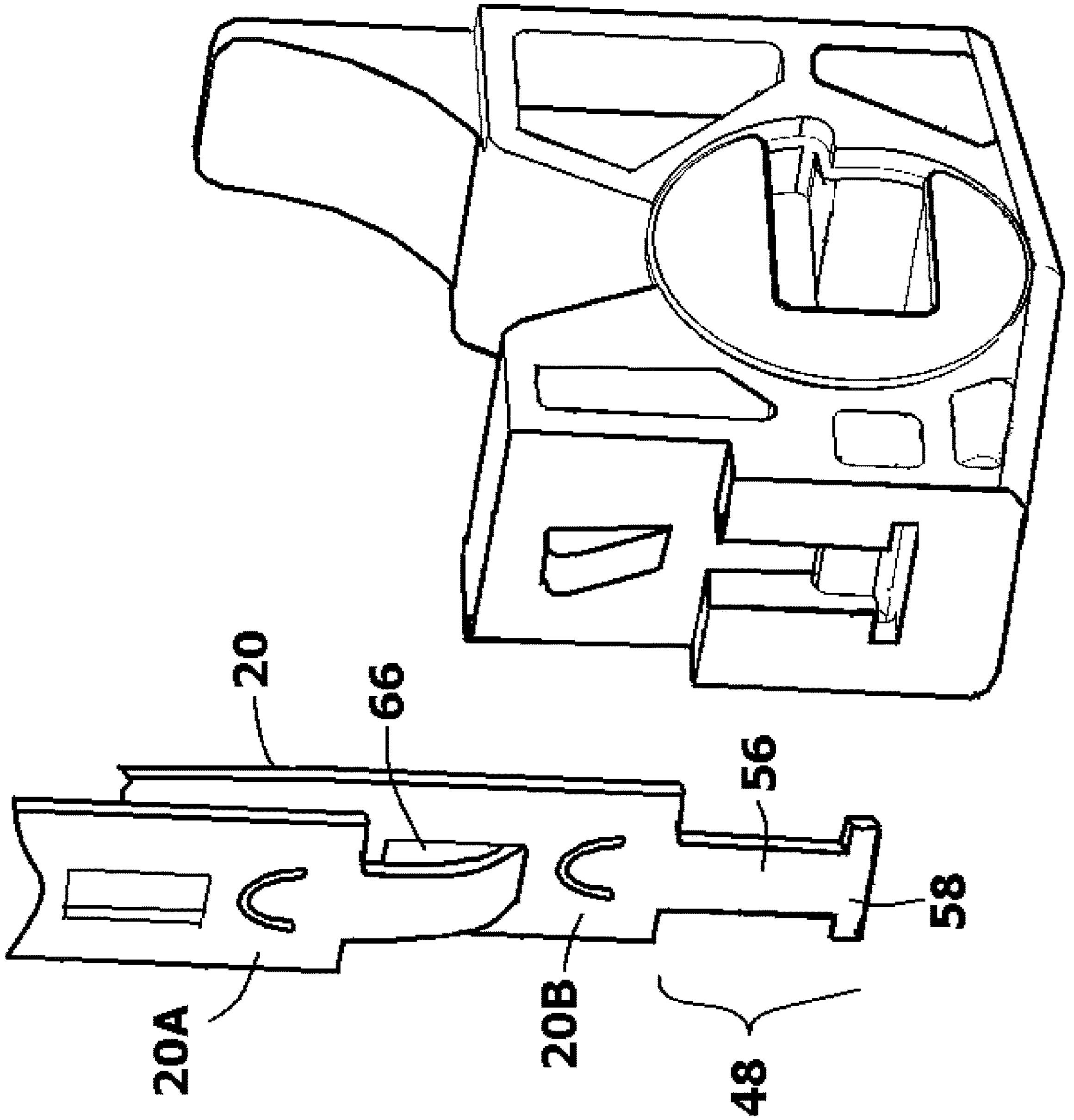
FIG. 7 shows an alternate embodiment that uses multiple ribbon springs.

In all previous embodiments, a single ribbon spring engages the brake shoe assembly. However, if a window sash is particularly large and/or heavy, multiple ribbon springs may be ganged together. In FIG. 7, it can be seen that the connector slot 66 in the ribbon spring 20 is shaped so that multiple ribbon springs, can be ganged together. The shaped head 48 has a narrowed neck 56 with a wide leader 58. The narrow neck 56 has a width. The leader 58 has a wider width. This enables the shaped head 48 from a first ribbon spring 20A to mechanically engage a second ribbon spring 20B by passing the shaped head 48 of one ribbon spring 20A through the connector slot 66 of a second ribbon spring 20B. This gang connection can be repeated to join a plurality of ribbon springs together.

It will be understood that the embodiments of the present invention counterbalance system that are described and illustrated herein are merely exemplary and a person skilled in the art can make many variations to the embodiment shown without departing from the scope of the present invention. All such variations, modifications, and alternate embodiments are intended to be included within the scope of the present invention as defined by the appended claims.

What is claimed is:

1. In a tilt-in window assembly having a sash that moves in a guide track, wherein the sash can be selectively moved into a tilted orientation, a counterbalance system comprising:

a ribbon spring having a first end, said ribbon spring having a flexible tab formed thereon;

a brake shoe that moves in said guide track with said sash, said brake shoe having a receptacle that receives and retains said first end of said ribbon spring, wherein said brake shoe expands and locks in said guide track when said sash is moved into said tilted orientation;

a protrusion extending from said brake shoe, wherein said protrusion presses against said flexible tab and moves said flexible tab into contact with said guide track when said brake shoe expands.

2. The system according to claim 1, wherein said brake shoe has a relief formed thereon, wherein said ribbon spring extends across said relief when engaging said brake shoe, wherein said protrusion is disposed within said relief.

3. The system according to claim 1, wherein said protrusion has a curved crown that contacts said flexible tab.

4. The system according to claim 3, wherein said protrusion has an inclined surface that leads to said curved crown, wherein said inclined surface contacts said flexible tab and causes said flexible tab to deflect in a direction governed by said inclined surface.

5. The system according to claim 1, wherein said ribbon spring has a shaped head that leads to said first end, wherein said brake shoe receives and engages said shaped head, therein joining said brake shoe to said ribbon spring.

6. The system according to claim 5, wherein said flexible tab is formed into said ribbon spring prior to said shaped head, wherein said shaped head is interposed between said flexible tab and said first end.

7. The system according to claim 6, wherein a connector slot is formed in said ribbon spring that enables a secondary spring to interconnect with said ribbon spring.

8. The system according to claim 7, wherein said flexible tab is interposed between said connector slot and said shaped head.

9. A counterbalance system set in a guide track of a tilt-in window, said system comprising:

a ribbon spring that terminates with a shaped head;

a flexible tab formed in said ribbon spring;

a brake shoe having a receptacle formed therein, wherein said receptacle receives and retains said shaped head of said ribbon spring, therein interconnecting said ribbon spring to said brake shoe;

a protrusion extending from said brake shoe;

a cam supported within said brake shoe, wherein said cam expands said brake shoe when turned, therein causing said protrusion on said brake shoe to be biased against said flexible tab in said ribbon spring, therein causing said flexible tab to flex and extend away from said ribbon spring at an inclined angle.

10. The system according to claim 9, wherein said protrusion has a curved crown that contacts said flexible tab.

11. The system according to claim 10, wherein said protrusion has an inclined surface that leads to said curved crown, wherein said inclined surface contacts said flexible tab and causes said flexible tab to deflect at said inclined angle.

12. The system according to claim 9, wherein said flexible tab is formed into said ribbon spring prior to said shaped head.

13. The system according to claim 12, wherein a connector slot is formed in said ribbon spring that enables a secondary spring to interconnect with said ribbon spring.

14. The system according to claim 13, wherein said flexible tab is interposed between said connector slot and said shaped head.

* * * * *